Patented Mar. 2, 1937

2,072,120

UNITED STATES PATENT OFFICE 2,072,120

RESINOUS MATERIAL

Louis A. Mikeska and Stewart C. Fulton, Elizabeth, N. J., assignors to Standard Oil Development Company, a corporation of Delaware No Drawing. Application June 6, 1933, Serial No. 674,519

24 Claims. (Cl. 260—2)

This invention relates to improved resinous materials soluble in hydrocarbon oils and to methods for preparing such materials. It relates more particularly to methods for increasing the solubility of high molecular weight polymerized or condensed resinous materials in hydrocarbon oils, especially in petroleum oils.

Many high molecular weight synthetic products prepared by polymerization or condensation reactions involving aromatic compounds are known to be insoluble in hydrocarbon solvents, such as benzol, naphthas and the heavier gas oil and lubricating oil fractions of petroleum. It has been found that such resinous products can be alkylated to produce products which are soluble in lubricating oils and other hydrocarbon solvents generally. It has also been found that such improved alkylated products are valuable for many purposes, for example, as oil thickeners and when they are added in proportions of even a few per cent, improve very materially the viscosity characteristics of lubricating oils. Many of the alkylated products, especially those of highest molecular weight, possess desirable characteristics for use as film-forming agents, and are suitable for the preparation of coating compositions such as paints, varnishes and lacquers, permitting the use as solvents in such compositions of large amounts of petroleum naphthas.

The initial resinous materials which may be rendered soluble in hydrocarbon oils according to this invention, include resinous products containing a reactive aromatic group. Such a group comprises an aromatic nucleus, such as a benzene ring, having attached thereto a reactive radical, i. e., one capable of being displaced by an alkyl group according to the known methods of alkylation. Hydrogen, the halides, and other acid radicals such as sulfuric and sulfonic are among those which may be removed from an aromatic nucleus and substituted by an alkyl group by known synthetic methods, such as the Fittig and the Friedel-Craft syntheses. It is preferable that the initial resinous material be soluble in some solvent which is inert to or reacts only slowly with the reagents used in the alkylation reaction. This invention accordingly does not include insoluble and infusible end products of polymerization and condensation reactions, commonly known as "resinoids" and the like. Examples of resinous materials which may be alkylated according to the present invention are the high molecular weight products formed by reaction of an alkyl dihalide with an aromatic hydrocarbon, such as ethylene dichloride with benzol, also by polymerization of styrene and indene, and also the phenol type resins such as the phenol formaldehyde resins, other resinous materials derived from phenols, the resins prepared from phthalic anhydride, the naphthalene formaldehyde resins, and generally those resinous products, soluble in some solvent, and prepared from an aromatic compound by polymerization or condensation reaction.

It has been found that the solubility of such resins in hydrocarbon oils is increased markedly by the addition of one or more alkyl groups to each molecule of the resin. It is usually sufficient for the present invention to conduct the alkylation so that only a relatively small proportion of the benzol or other aromatic nuclei of the resin are alkylated. The extent of alkylation desired depends upon the initial solubility of the resinous material to be alkylated and the extent of increased solubility desired, the less soluble materials requiring the greater amount of alkylation. Their solubility is generally dependent upon their molecular weight and structure. That is, in a series of resinous materials of the same general structure but of varying molecular weight, the solubility decreases with increasing molecular weights. Ordinarily only 10 to 25 or 50% of the benzol nuclei need be alkylated. It will be understood that this invention may be used to modify the properties of such resinous materials generally, to increase the thickening characteristics in blends with lubricating oils of resins already soluble therein and to increase the solubility of resins soluble only to a limited degree in hydrocarbon oils or soluble only in certain classes of hydrocarbon oils such as aromatic hydrocarbons, as well as to render soluble the resinous materials originally substantially insoluble in hydrocarbon solvents.

The alkylation reaction may be conducted by any of the ordinary organic syntheses suitable for addition of an alkyl group to an aromatic nucleus; for example, the Fittig and the Friedel-Craft reactions may be used with appropriate resinous materials and alkyl halides. Another method is by combination of an olefine with the resin in the presence of a suitable catalyst, such as aluminum chloride or sulfuric acid. Still another method is by reaction of an aliphatic alcohol with the resin in the presence of strong sulfuric acid or other dehydrating catalyst. It is desirable that all such reactions be conducted with a solution of the resin in a substantially inert solvent. It is therefore apparent from this description that the term "alkylation" employed herein is limited only to cases wherein a carbon atom of the resin is joined directly to a carbon atom of the alkylating agent.

The alkyl groups added to the resins by the above processes may be of any desired size from 1 to 20 or more carbon atoms; for example, suitable alkylating agents are the lower aliphatic halides and alcohols, the higher fatty alcohols and their halides, chlor-paraffins such as chlorinated paraffin wax, and normally gaseous or liquid olefines including the liquid products obtained by cracking paraffin wax. The use of alkyl compounds containing a straight chain is generally preferred. The primary and secondary alkyl halides of four to six or more carbon atoms have been found especially suitable for use in alkylations conducted by the Friedel-Craft reaction. Alkylation with alkyl groups of short chain or a more "branchy" structure generally results in less desirable products. For example, the use of tertiary halides, of the mixed halides such as the amyl chlorides of commerce, and of isopropyl halides is less preferable and may result in difficultly soluble or gel-like products.

The following examples are presented to indicate the application of this invention to illustrative types of resins and are not to be considered as limiting this invention in any way.

Example 1

A resinous product is prepared by a progressive condensation reaction of equal molal quantities of benzol with ethylene dichloride under reflux in the presence of anhydrous aluminum chloride as described in the co-pending application No. 674,520 filed June 6, 1933, by Mikeska and Fulton. This resinous product is obtained by refluxing a mixture of 200 parts by weight of benzol, 250 parts ethylene dichloride and 20 parts aluminum chloride at 70 to 80° C. until the reaction mixture thickens appreciably. If the refluxing is continued for too long a time there is formed an insoluble rubber-like mass which is not desired for the present invention. The refluxing is accordingly stopped before the formation of this undesirable end product and the reaction mixture is then washed with water and distilled to about 225° C. at 1 mm. absolute pressure. There are thus obtained as a distillation residue 186.5 parts of a rubbery plastic product which is soluble in benzol, ethylene dichloride, carbon disulfide, and is insoluble in all paraffin base solvents and petroleum lubricating oils.

Fifty parts of the above product are dissolved in 200 parts of carbon disulfide and 5 parts of anhydrous aluminum chloride are added to the solution. The mixture is agitated at room temperature and 50 parts of secondary amyl chloride are added slowly, drop by drop, over a period of about one and a half hours, care being taken to avoid a local excess of alkyl chloride at any time in the reaction mixture. The agitation is continued for three hours. The reaction mixture is then thoroughly washed with water and is distilled to remove the carbon disulfide and any unreacted amyl chloride. There are thus obtained as a distillation residue 71.5 parts of an alkylated plastic product of about 1,300 average molecular weight and which is more rubbery than the original product treated and is completely soluble in paraffin base solvents, petroleum lubricating oils and the like. This product has a marked thickening action in blends with suitable solvents and may be used to improve the viscosity and viscosity index of lubricating oils. For example, 5 parts of this alkylated product are added to 95 parts by weight of a petroleum lubricating oil. The original oil has a viscosity of 198 seconds Saybolt at 100° F. and 46.4 seconds at 210° F. and a viscosity index of 93. The blend has a viscosity of 284 seconds Saybolt at 100° F., 55 seconds at 210° F. and a viscosity index above 120.

Example 2

A resinous product prepared by reaction of benzol and ethylene dichloride as described in Example 1, but of somewhat harder texture and higher molecular weight than the product there obtained, requires twice the amount of secondary amyl chloride to produce, by the method described in Example 1, an alkylated product miscible with petroleum lubricating oils. This product is of about 2,000 average molecular weight. It is added to a petroleum lubricating oil to produce the following blends:

|  | Initial oil | Blends | |
| --- | --- | --- | --- |
| Alkylated product (per cent) | 0 | 5 | 10 |
| Viscosity—Seconds Saybolt: | | | |
| At 100° F. | 198 | 348 | 606 |
| At 210° F. | 46.4 | 61.5 | 83 |
| Viscosity index | 93 | 126 | 129 |

Example 3

Styrene is polymerized with boron fluoride to a semi-plastic polymer of the same solubility characteristics as the unalkylated plastic product described in Example 1. This poly-styrol is reacted with an alkyl halide in the same manner described in Example 1. The resulting alkylated poly-styrol is soluble in paraffin base oils, petroleum lubricating oils and naphthas and hydrocarbon solvents generally. This product increases the viscosity and viscosity index of lubricating oils very materially when added to such oils, even in small proportions of a few percent.

These alkylated resinous products are generally miscible in all proportions with hydrocarbon solvents, and may be used as improving agents and thickening agents in gasoline, solvent naphthas, burning oils, lubricating oils, white oils, transmission lubricants, railroad car journal oils, slushing oils, paraffin waxes (as in the manufacture of candles) and like compositions. These products are of a plastic, resinous nature, and may be used alone or in suitable compositions as coating agents for surfaces and for coating and/or impregnation of fibrous substances such as textiles and textile fibers. These products may also be used in the preparation of plastic and moulded articles generally. The alkylated resinous products preferred for improving the viscosity index and for increasing the viscosity of lubricating oils are those products having a molecular weight of about 1,000 or 2,000 to 10,000 or higher, and especially those having a molecular weight of about 2,000 to 4,000.

The use of the present invention to increase the thickening action and the viscosity index improving action of resinous materials in blends with lubricating oils is indicated in the following example.

Example 4

An oily liquid resinous product of relatively low molecular weight is prepared by reaction of benzol and ethylene dichloride as described in Example 1. This product is soluble in carbon disulfide and similar solvents, but is soluble only in petroleum oils of naphthenic or aromatic type, being miscible in coastal oils only at temperatures above 90° F. This product is alkylated at 21° C. with secondary butylchloride in the manner described in Example 1 and a very tough resin of high softening point, soluble in all hydrocarbon oils, is obtained as the alkylated product. Blends of equal amounts of the original and alkylated product are prepared with a coastal oil, as follows:

|  | Coastal oil | Resin blends—25% by weight | |
|---|---|---|---|
|  |  | Before alkylation | Alkylated |
| Viscosity—Saybolt seconds: |  |  |  |
| At 100° C | 924 | 1,806 | 12,735 |
| At 210° C | 65 | 90.4 | 285 |
| Viscosity index | 9 | 28 | 53 |

This invention is especially useful for increasing the solubility in petroleum solvents of the aromatic resins commonly used in varnishes and lacquers. For example, the solubility in petroleum solvents of a benzol-soluble phenol-formaldehyde resin, is increased by alkylation with secondary butyl chloride and aluminum chloride or other catalyst. The poly-styrol resin used in Example 3, above, is also used in preparing coating compositions. These and many other such resins are soluble in aromatic solvents but are difficultly soluble in paraffinic solvents. Their solubility in the latter solvents is markedly increased by alkylation, thereby permitting the use of much larger proportions of the cheaper petroleum solvents in the preparation of such coating compositions.

This invention is not to be limited to any theories which have been presented in explanation of the described processes, nor to any illustrative examples thereof, but only by the following claims in which we wish to claim all novelty insofar as the prior art permits.

We claim:

1. Process for preparing improved resinous material soluble in hydrocarbon oils, comprising alkylating a resinous material containing a reactive aromatic group.

2. Process according to claim 1 in which the alkylation reaction is conducted with a solution of said initial resinous material in an inert solvent.

3. Process according to claim 1 in which the initial resinous material is soluble in carbon disulfide.

4. Process for preparing improved resinous material soluble in hydrocarbon oils comprising alkylating a resinous material containing reactive aromatic hydrogen by substituting for said hydrogen an alkyl group.

5. Process according to claim 4 in which the alkylation reaction is conducted with an alkyl halide and a suitable catalyst for the Friedel-Craft reaction.

6. Process according to claim 4 in which the alkylation is conducted by the Friedel-Craft reaction with an alkyl halide selected from the group consisting of normal and secondary alkyl halides of more than three carbon atoms.

7. Process according to claim 4 in which the alkylation is conducted with a straight chained saturated alkyl compound.

8. Process according to claim 4 in which the alkylation reaction is conducted with an olefin and a suitable catalyst.

9. Process for preparing a high molecular weight condensation product soluble in petroleum lubricating oils comprising alkylating a synthetic resinous hydrocarbon material soluble in carbon disulfide and containing a reactive aromatic group.

10. Process for increasing the viscosity improving characteristics of high molecular weight condensation products in lubricating oil blends comprising alkylating a synthetic high molecular weight hydrocarbon condensation product, containing a reactive aromatic group and soluble in an inert solvent, with a suitable alkylating agent and catalyst in said inert solvent.

11. Process for increasing the thickening action in lubricating oil blends of a resinous material containing a reactive aromatic group comprising alkylating said resinous material.

12. Process according to claim 11 in which the first resinous material is soluble in petroleum lubricating oil.

13. Composition of matter comprising a resinous material soluble in hydrocarbon solvents and prepared by alkylating a resinous material containing a reactive aromatic group.

14. Composition of matter comprising an alkylated polymerization product of an aryl olefin, said alkylated product being soluble in petroleum oils.

15. Composition of matter comprising an alkylated resinous material of high molecular weight and soluble in carbon disulphide, said alkylated material having a resinous nature and being soluble in petroleum oils.

16. Composition of matter comprising an alkylated poly-styrol resin.

17. Composition of matter comprising an alkylated poly-styrol resin soluble in petroleum oils.

18. Process for improving the viscosity characteristics of hydrocarbon oils comprising adding thereto a resinous material prepared by alkylation of a resinous material containing a reactive aromatic group.

19. Process for preparing improved resinous material soluble in hydrocarbon oils comprising alkylating a high molecular weight polymerization product of an aryl olefin containing reactive aromatic hydrogen, by substituting for said hydrogen an alkyl group.

20. Process for preparing improved resinous material soluble in hydrocarbon oils, comprising alkylating a high molecular weight polymerization product of styrene soluble in carbon disulfide and containing reactive aromatic hydrogen, by substituting for said hydrogen an alkyl group.

21. A hydrocarbon oil of improved viscosity characteristics comprising a hydrocarbon oil containing in solution a resinous material prepared by alkylation of a resinous material containing a reactive aromatic group.

22. A composition of matter comprising a petroleum lubricating oil containing in solution an improved resinous material prepared by alkylation of a resinous material containing a reactive aromatic group.

23. A composition according to claim 22 in which said improved resinous material is prepared by alkylating a high molecular weight polymerization product of an aryl olefin containing reactive aromatic hydrogen by substituting for said hydrogen an alkyl group.

24. Composition according to claim 22 in which said improved resinous material is prepared by alkylating a high molecular weight polymerization product of styrene soluble in carbon disulfide and containing reactive aromatic hydrogen by substituting for said hydrogen an alkyl group.

LOUIS A. MIKESKA.
STEWART C. FULTON.